United States Patent [19]

Hiatt

[11] 4,043,760

[45] Aug. 23, 1977

[54] COUNTER CURRENT DECANTATION APPARATUS

[76] Inventor: Martin H. Hiatt, 993 Vernon Ave., Venice, Calif. 90291

[21] Appl. No.: 603,695

[22] Filed: Aug. 11, 1975

[51] Int. Cl.$^2$ .................. B01D 11/00; B01D 59/24
[52] U.S. Cl. .................. 23/270 R; 23/270.5 R; 75/121; 75/1 R; 134/83; 209/173; 266/101; 423/27; 423/41; 423/658.5
[58] Field of Search ............... 75/1, 2, 121; 209/166, 209/167, 168, 157, 173; 266/101, 122; 210/195 R, 195 S, 416 R, 456, 407, 288, 389, 194, 521, 522; 423/658.5; 23/270 R, 270.5 R; 259/180, 4 R, 4 A, 4 AC; 134/60, 83

[56] References Cited

U.S. PATENT DOCUMENTS

| 708,494 | 9/1902 | Randall | 23/270 R |
|---|---|---|---|
| 1,180,089 | 4/1916 | Thompson | 209/166 |
| 1,226,330 | 12/1976 | Haultain | 209/167 |
| 1,886,979 | 11/1932 | Ruth, Jr. | 209/166 |
| 1,906,386 | 5/1933 | Liljenroth | 23/270 R |
| 2,765,913 | 10/1956 | Weiss et al. | 23/270 R |
| 3,083,126 | 3/1963 | Griffiths | 134/60 |
| 3,339,730 | 9/1967 | Boutin et al. | 209/166 |

FOREIGN PATENT DOCUMENTS

| 432,938 | 12/1911 | France | 209/157 |
|---|---|---|---|
| 293,171 | 8/1915 | Germany | 75/97 |
| 1,126,812 | 4/1962 | Germany | 75/101 |
| 86,600 | 6/1936 | Sweden | 210/195 |

*Primary Examiner*—L. Dewayne Rutledge
*Assistant Examiner*—Michael L. Lewis
*Attorney, Agent, or Firm*—Criddle, Thorpe & Western

[57] ABSTRACT

A counter current decantation system for the fluid separation of liquids or solids having different densities or absorptive capacities wherein the material to be separated is placed in an inclined separator having a series of decantation pipes, each of which is connected at the bottom thereof to a pump for pumping a fluid mixture upstream at varying pressures. The separation fluid enters the separator at the bottom with sufficient force to form a mixture with and agitate the material to be separated. Lighter material is caused to rise toward the fluid surface and the heavier material is caused to settle to the separator floor by gravity. The force supplied is sufficient to cause the fluid mixture to pass forwardly through the length of the separator and thus the fluid mixture has a tendency to flow downstream toward the bottom end of the separator. The upper portion of the fluid mixture containing the absorbed or lighter particles flows into the decantation pipes and is then pumped upwardly past the next adjacent decantation pipe and deposited back into the fluid mixture. By using such a "leap-frog" pumping system the fluid material passing upwardly throughout the length of the separator becomes concentrated in the lighter material to be separated or absorbed and can there be removed at a point near the upper end of the separator. On the other hand, the heavier material flows downwardly along the floor of the inclined separator and is expelled at the lower end.

5 Claims, 3 Drawing Figures

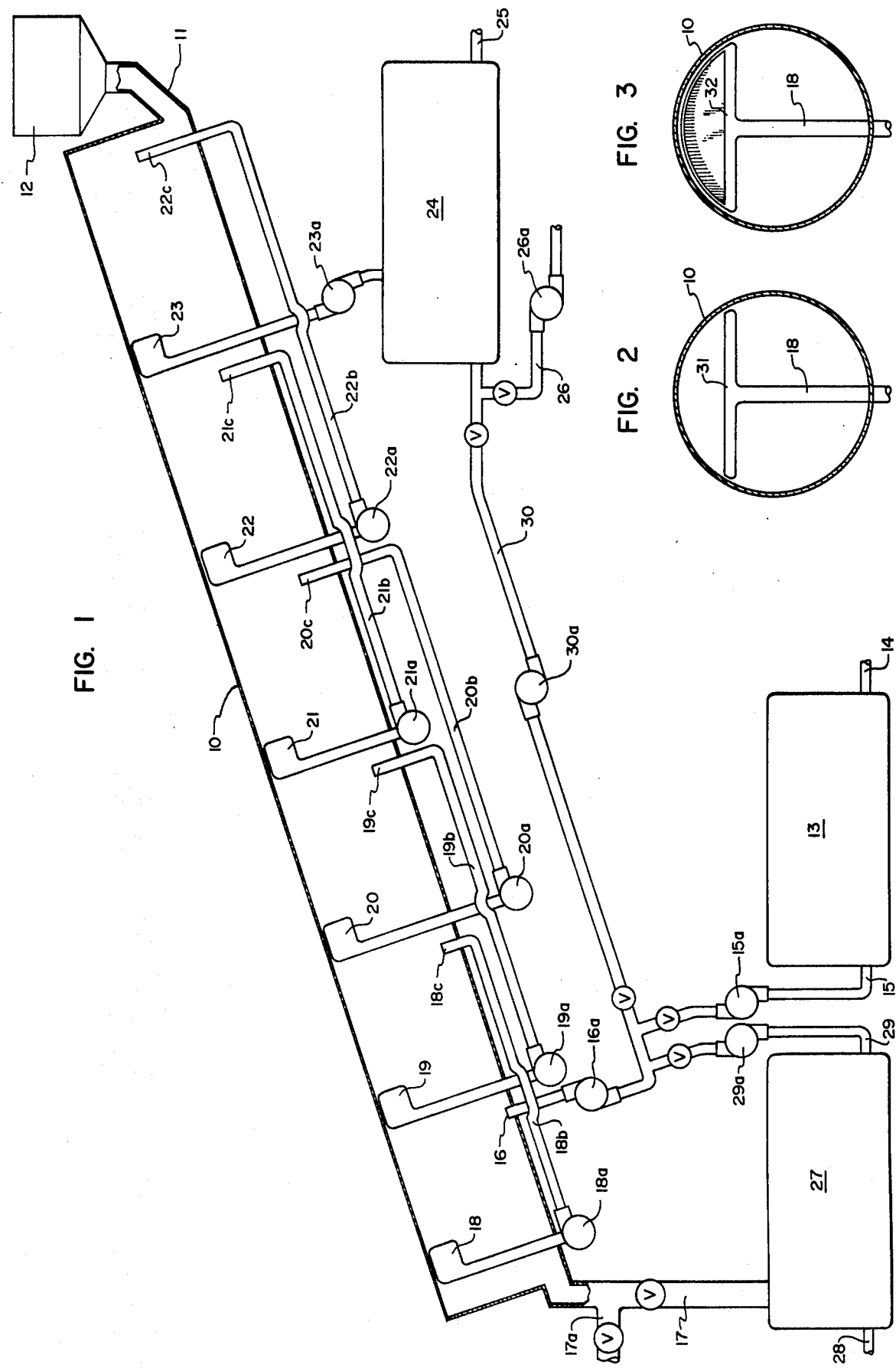
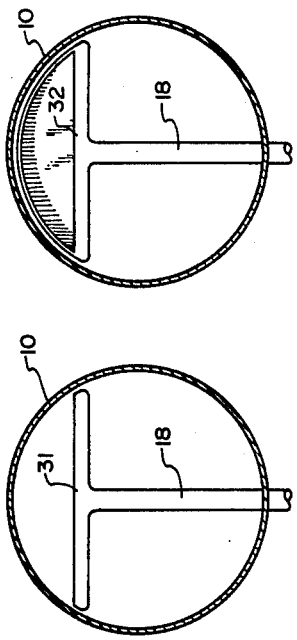
FIG. 1
FIG. 2
FIG. 3

COUNTER CURRENT DECANTATION APPARATUS

BACKGROUND OF THE INVENTION

This invention relates to a counter current decantation system for the fluid separation of liquids or solids having different densities or absorptive capacities. More particularly, this invention relates to a counter current decantation system wherein fluid separation of materials having different densities or absorptive capacities can be carried out by a means of a series of decantation pipes and pumps which cause the absorbed or lighter particles in the fluid material to be constantly pumped upstream while allowing the heavier matter to flow downwardly by gravity.

The use of counter current extraction apparatuses wherein materials having different densities or absorptive capacities are separated are well known in the art. Some of these processes operate in a vertical separator wherein the fluid passing upwardly either chemically or physically absorbs the lighter or absorptive materials and passes out of the top of the reactor as a fat solvent wherein the depleted material is removed from the bottom of the separator. These apparatuses operate on a continuous counter current flow basis and while sufficient for many operations, are not particularly useful for other separation techniques such as the chemical leaching of ores wherein repeated cycles or washings may be desirable.

On the other hand, it is shown in U.S. Pat. Nos. 3,599,791; 3,240,336; 2,631,726 that inclined counter current separators may be utilized for hydraulically sorting particulate matter of different sizes and densities. However, in these patents the force of the fluid flowing upwardly throughout the separation apparatus is a constant force adjusted such that the larger particles will flow downwardly by gravity and the upward particles will flow out the top end of the apparatus with the fluid in counter current relationship.

OBJECTS AND BRIEF DESCRIPTION OF THE INVENTION

It is an object of the present invention to provide a decantation system for the counter separation of particles having different densities and sizes.

It is also an object of the present invention to provide decantation system for the counter current extraction of minerals from solid mineral bearing materials.

A still further object of the present invention is to provide a process for the counter current extraction of immiscible liquids.

It is another object of this invention to provide an apparatus and method for the separation of liquid factions wherein one component of the liquid faction is soluble in the extracting liquid.

These and other objects may be accomplished by means of a novel decantation system consisting of a separator housing of any length having extended through the floor thereof in spaced relationship, a series of decantation pipes. These pipes extend upwardly through the floor of the separator housing a predetermined distance and terminate with a flared outer opening into which any liquid flowing over the opening will drain. The separator housing is maintained on an inclined plane and each decantation pipe is connected to a variable drive pump which receives the liquid flowing into the decantation pipe and pumps said liquid upstream past the next adjacent decantation pipe and delivers the fluid back into the separator housing at a point upstream or forward of the said next adjacent decantation pipe. The material to be separated is fed into the top end of the inclined separation housing and the separation fluid is fed into the lower portion of the separation housing preferably just upstream from the last decantation pipe. The overall flow of liquid and material in the separator is downstream by gravity flow, however, by the unique feature of decantation pipes and pumps the net effect is that the lighter material at the surface of the fluid stream in the separator housing is continuously moved upstream until removed by the separator through the last decantation pipe.

By use of this novel "leap-frog" pumping mechanism various different types of separation techniques may be carried out. By utilizing the decantation separator of the invention it is possible to separate particles of different size and densities. By means of counter current flow it is also possible to separate immiscible liquids and to extract one liquid from another or to extract a soluble material from a solid particle such as in the acid leaching of minerals from mineral bearing ores.

In all cases it is essential that one of the phases to be separated, whether in particulate form or as a fluid, be sufficiently dense that it will not only flow downstream by gravity but will also settle to the bottom of the separator floor, even under mild agitation.

In operation of the invention, the material to be separated enters the front elevated end of the separator housing and by gravity, flows downwardly toward the lower end of the separator. During the course of movement the material passes through several points of agitation wherein it is thoroughly mixed with a separating fluid. This is accomplished by introducing the separating fluid into the separator at a point upstream from the last decantation pipe. The separation fluid can be water, oil, an organic solvent, or any other liquid which can provide for a physical separation of the materials to be separated. The separation may either be accomplished by the difference in densities of the materials to be separated or by physical absorption into the separating fluid, which, in some cases, may also involve a chemical reaction, i.e., the converting of a metal oxide or sulfide for example to a soluble metal sulfate by using sulfuric acid as a separating medium. The separating fluid enters into the separator with sufficient velocity to thoroughly agitate and intermix the separating fluid with the material to be separated. The lighter material is carried upwardly toward the fluid surface, or in the alternative, is dissolved or absorbed by the liquid and carried upwardly, and passes into the lower most decantation pipe. It is possible that some of the heavier particles will also be carried upwardy and into the decantation pipe. A pump connected to the pipe carries the material flowing into the decantation pipe upstream, past the next adjacent decantation pipe, and redeposites the decanted fluid into the separator at a predetermined position above the separator floor. Again, agitation of the material to be separated takes place and further extraction or separation of light materials is accomplished by means of the upward flow toward the fluid surface. This material flows downstream into the next decantation pipe, whereas, the heavier material sinks to the separator floor and flows downwardly toward the exit. It is advantageous if each succeeding step in the series is carried out whereby the fluid pumped by leap-frog fashion upstream is distributed into the separation chamber at a point slightly higher from the separator floor than the previous point of introduction. In this manner the most severe agitation takes place at the lower portion of the separator, and by the time the fluid is pumped to the upper portion of the inclined separator, a thorough washing of the material to be separated will have taken place, but there will be less chance for the heavier material to be severly agitated and carried upwardly into the decantation pipes. Thus, the material separated by the last decantation pipe will contain substantially no heavy material and will either be a fat solvent, i.e., one wherein the material to be separated is absorbed or chemically reacted or will contain the lighter particulate matter which is to be separated. The heavier material, whether it be in the form of a fluid or heavier particulate matter, will exit the lower inclined end of the separator. In the case of mineral extraction, the heavier material may be bled directly to a tailings pond. In other operations, if desired, conventional means can be provided for separating any remaining fluid at the lower end of the separator such as centrifical means, filters and the like, and any unused fluid can be recycled back to the system. Likewise, the material exiting the upper most decantation pipe can be treated in any desired manner to recover the lighter particulate matter or desorb material contained therein. For example, in a copper recovery process, the dissolved copper may be subjected to electrolytic precipitation or lighter particulate matter may be centrifuged, filtered out, or passed as a slurry to another stage of a process wherein said material may be used. Once separated, the methods of recovering the lighter and heavier particulate matter and/or absorbed material from the separating fluid may be done by conventional means.

DRAWINGS OF THE INVENTION

In the drawings:

FIG. 1 is a longitudinal cross-section of the separation system of the invention showing one form of decantation pipes and one method of pumping the decanted fluid upstream.

FIG. 2 is a transverse cross-sectional view of the separation system of the invention having a vertical decantation pipe opening.

FIG. 3 is a transverse cross-sectional view of the separation system of the invention having a horizontal decantation pipe opening.

DETAILED DESCRIPTION

Referring now to the drawings:

There is shown in FIGS. 1, 2 and 3 an operative embodiment of the present invention. The main operational component of the decantation system is an inclined system having a housing 10 containing decantation pipes 18 to 23 and pump and piping means as hereinafter described for moving fluid upstream counter to the movement of the material to be separated.

For purposes of the detailed description of the separator the material to be separated will be considered to be a comminuted copper bearing ore and the fluid material to be a dilute solution of sulfuric acid whereby the copper in the ore is leached into the solution and the gangue is separated from the lower incline of the separator floor and the extracted copper is removed from the upper most decantation pipe. Before beginning the operation the copper bearing ore is comminuted to about 100 mesh or less. The ore will enter separator 10 which is preferably cylindrical in shape, through line 11 located in the upper end of separator 10. The ore material may be fed into the separator from holding tank 12 or other appropriate means.

To begin the counter current extraction process, dilute sulfuric acid is added to holding tank 13 through pipe 14 and then pumped via lines 15 and 16 by means of pumps 15a and 16a into the separator until the separator is essentially filled with dilute acid. The separator is then ready to begin the extraction process. The ore will have a tendency to settle to the bottom of separator 10 and by gravity flow down the separator floor towards exit 17. The sulfuric acid solution is pumped from holding tank 13 as previously stated via lines 15 and 16 into the lower portion of the inclined separator, preferably at a point just downstream from the penultimate decantation pipe. The acid enters with sufficient force to cause agitation of the comminuted ore thereby resulting in the leaching extraction of the copper from the ore. The ore is lifted upwardly toward the top of the separator by means of the injected acid. The unextracted ore or gangue will have a tendency to sink by gravity to the floor of the separator and the copper containing acid solution will flow upwardly and be decanted through into decantation pipe 18 and pumped through pump 18a through line 18b and is then redeposited back into the separator upstream via pipe 18c. Some comminuted ore may also be carried through the decantation pipe 18 depending upon the degree of agitation. Pipe 18c extends from the floor of the separator slightly higher than does pipe 16 and the copper containing acid enters with such force that the comminuted ore is again agitated causing the further leaching to take place. Again, the ore material will settle by gravity toward the floor of separator 10 wherein the acid extractant containing additional copper will be decanted via pipe 19 through pump 19a into line 19b and redeposited back into the separator via line 19c. Pipe 19c extends above the floor of separator 10 slightly higher than does pipe 18c and again the acid solution containing the copper enters through line 19c with sufficient force to cause agitation of the comminuted ore material causing further extraction to take place. Again, the comminuted ore which is partially depleted of the copper settles to the bottom of the separator by gravity flow and the copper rich acid solution is decanted via line 20 through pump 20a via line 20b and is redeposited back into the floor of the separator via line 20c. It will be noted that line 20c extends slightly higher above the floor of separator 10 than does line 19c. The copper rich acid enters separator 10 via line 20c again with sufficient force to cause agitation of the comminuted ore whereby further extraction takes place. Again, the comminuted ore material settles to the floor of the separator 10 by gravity flow and the ever increasing copper rich acid solution is decanted via line 21, through pump 21a, line 21b, and re-enters the separator via line 21c. The copper rich acid solution enters the separator through line 21c again with sufficient force to cause agitation of the comminuted ore, thereby allowing further extraction to take place. The comminuted ore again alls via gravity flow to the floor of separator 10 whereas the increasingly rich copper containing acid extractant is decanted via line 22 through pump 22a, line 22b, and is redeposited into the separator via line 22c. Line 22c again is extended into the separator further than line 21c but still allows for a certain amount of agitation of a comminuted ore material thereby causing additional extraction to take place.

Obviously, the separation system can be of any length and any number of decantation pipes can be used. However, for purposes of illustration, the final decantation takes place via line 23 wherein the copper rich acid solution is pumped via pump 23a into tank 24, which can, if desired, also contain additional separation means.

It is obvious from the description thus far that in the counter current technique used the fresh acid entering line 16 comes in contact with the ore containing the least amount of copper, whereas, the copper rich ore entering line 11 first comes in contact with the copper rich acid extractant. This is a well known principle of counter current extraction wherein the most depleted ore comes in contact with the freshest solvent which allows for more complete recovery. Moreover, it is to be noted that each of lines 16, 18c, 19c, 20c, 21c and 22c increase in height from the floor of separator 10. Each time the acid is recycled the comminuted ore is agitated but each successively higher pipe towards the upstream end of the extraction process, i.e., lines 21c and 22c provides for less agitation and therefore less chance that there will be comminuted ore material being decanted through lines 22 and 23. In other words, the more severe agitation takes place at the lower end of separator 10, whereas, the copper rich acid solution as it progresses upwardly through the separator becomes less and less likely to carry with it comminuted ore particles. The material thus entering tank 24 should be relatively free of gangue material. However, if desired, further separation may take place by means of filtering centrifuging and the like and the solid material may exit line 25, whereas, the copper rich solution is pumped via line 26 by means of pump 26a to a recovery procedure such as conventional electrolytic separation. Likewise, the gangue material flows by gravity through opening 17 directly to a tailings pond by means of line 17a or into holding tank 27 where further separation may also take place. Since there will obviously be excess acid in the gangue which may be utilized again for extraction purposes the gangue may be separated through lines 28 to a tailing pond and the recovered acid pumped back through line 29 by means of pump 29a into line 16 for further introduction into the separator 10.

The decantation pipes are preferably flared at the upper end and extend horizontally from one wall of the housing to the other wall. The pipes can terminate with either a vertical opening 31 as shown in FIG. 2 or a horizontal opening 32 as shown in FIG. 3.

Although the above process has been described in terms of the use of an extractive solvent in the separation of a mineral from a mineral bearing ore, the process could be used equally well in separating particulate matter having different densities or in separating immiscible liquids such as water and oil. For example, in the aqueous separation of clay from a gold bearing sand, the sand and heavy minerals would separate to the floor of the separator 10 and the lighter clay particles would be intermixed with the water and decanted via pipes 18 through 23. The water exiting through pipe 23 into container 24 could then be clarified by appropriate means and the clay removed via line 25 and the water recycled via line 30 by means of pump 30a into line 16 for reuse. Likewise, the mineral containing sand separated would exit via line 17 into container 28 wherein the sand and water could be separated and the sand removed via line 28 and the water recycled via line 29 by means of pump 29a into line 16.

Other obvious modifications can also be utilized such as solvent extraction of aromatics from nonaromatics in a refining process.

It is to be noted that in the overall operation of the separator 10 and its component parts, while providing for a counter current motion of fluid through the separator, does so in a unique manner whereby the actual flow of liquids within the separator is always downstream toward the bottom of the separator. The unique counter current extraction process is carried out by means of the series of pumps 18a through 23a whereby the decanted material entering into pipes 18 through 23 is carried upstream in leap-frog fashion and discharged into the separator in such a manner that the lighter material flowing upwardly toward the top of separator 10 will be, in most part, captured by the next adjacent decantation pipe as the fluid mixture moves downstream. In other words, material entering through decantation pipe 18 will be pumped upstream and deposited into the separator at a point just below or downstream from pump 20a. The fluid thus discharged through pipe 18c will move upwardly depending on the force supplied by pump 18a and be decanted or separated by means of pipe 19 which then discharges the material through pipe 19c at a point whereby the lighter material will be removed by decantation pipe 20, etc. When operating in this manner and with each succeeding discharge pipe 18c through 22c extending higher from the floor of separator 10, the lighter materials to be separated are thus removed by the decantation pipes which collect material as it flows downwardly through the separator via gravity flow, whereas, the heavier material in the bottom of the separation unit is permitted to continually flow downwardly throughout the length of the unit, being occasionally agitated by means of the discharge fluid from pipe 16 and 18c through 22c.

The positioning and placement of decantation pipes and the rate of flow through pumps 18a through 23a can be made variable and the length of separator 10 as well as the points at which discharge pipe 16 and 18c through 22c are inserted into separator 10 will have to be determined on a case basis, depending on the materials to be separated.

Although the invention as has been described is deemed to be that which would form the preferred embodiment of the invention, it is recognized that departures may be made therefrom without departing from the scope of the invention which is not to be limited to the details disclosed but is to be accorded the full scope of the claims so as to include any and all equivalent devices and apparatus.

What is claimed is:

1. A separation apparatus for the fluid counter current separation of products having different solvent absorptive capacities or densities which comprises:
    a. a longitudinal separator housing mounted on an inclined plane,
    b. a plurality of decantation pipes longitudinally spaced and extending through the separator housing in a fluid tight relationship, said pipes extending upwardly into the separator housing a distance and terminating in expanded openings sufficient to withdraw all of the fluid flowing over and into said openings,
    c. pump means and piping connected to the lower end of each decantation pipe for removing the fluid flowing through each decantation pipe and pumping said fluid back through the separator housing at a point upstream of the next adjacent decantation pipe and at a distance above the separator housing floor with the exception that the pump means connected to the most forward decantation pipe removes the fluid and lighter density product thus recovered from the separator housing, d. feed means contained in the upper inclined portion of the separator housing for introducing the material to be separated, e. feed means contained in the separator housing in fluid tight relationship near the lower inclined portion of the separator housing for introducing a fluid into the separator housing, and f. removal means contained in the separator housing floor at the lower end thereof for removing the heavier density product from which the lighter density product has been separated.

2. The separation apparatus according to claim 1 wherein the expanded opening of the decantation pipes extend horizontally from one wall of the separator housing to the other.

3. The separation apparatus according to claim 2 wherein the piping connected to the pump means for introducing the pumped fluid back into the separation housing enters the housing in a fluid tight relationship and terminates at a distance above the floor of said housing.

4. The separation apparatus according to claim 3 wherein the piping entering the housing floor nearest the lower inclined end terminates just above the separator housing floor and each successive piping entering the inclined housing toward the inclined front terminates at a greater distance above the floor than the piping just behind it.

5. The separation apparatus according to claim 4 wherein the pumps are variable and the pump and piping carries the fluid from one decantation pipe past the next succeeding decantation pipe and enters the separator housing at a point just behind the second succeeding decantation pipe.

* * * * *